(12) United States Patent
Smith et al.

(10) Patent No.: US 8,636,122 B2
(45) Date of Patent: Jan. 28, 2014

(54) CUSTOMIZABLE LUGGAGE AND METHOD OF FORMING SAME

(76) Inventors: Tim Smith, Birmingham, MI (US); Jocelyn Smith, Birmingham, MI (US); Anthony P. Bingham, Clarkston, MI (US)

( * ) Notice: Subject to any disclaimer, the term of this patent is extended or adjusted under 35 U.S.C. 154(b) by 945 days.

(21) Appl. No.: 12/612,201

(22) Filed: Nov. 4, 2009

(65) Prior Publication Data

US 2011/0016018 A1    Jan. 20, 2011

(51) Int. Cl.
*G06Q 30/00* (2012.01)
(52) U.S. Cl.
USPC ........... 190/18 A; 190/18 R; 705/26.5; 705/1; 705/26; 206/223; 12/146 R
(58) Field of Classification Search
USPC ........ 705/26.1, 26.5, 26, 27; 190/18 A, 18 R; 12/146 R; 36/9 R; 345/593
See application file for complete search history.

(56) References Cited

U.S. PATENT DOCUMENTS

| | | |
|---|---|---|
| 1,468,816 A | 9/1923 | Johnson |
| 2,455,861 A | 12/1948 | Gerson |
| 2,542,477 A | 2/1951 | Cart |
| 2,596,578 A | 5/1952 | McIntyre et al. |
| 2,874,813 A | 2/1959 | Bunte |
| 2,917,317 A | 12/1959 | Denholm |
| 3,352,389 A | 11/1967 | Chubb |
| 3,623,580 A | 11/1971 | Toller |
| 3,749,211 A | 7/1973 | Cima |
| 4,270,590 A | 6/1981 | Marshall |
| 4,895,230 A | 1/1990 | King |
| 6,173,837 B1 | 1/2001 | Marconi |
| 6,481,574 B1 | 11/2002 | Pakosh |
| 6,860,045 B1 * | 3/2005 | Sadler et al. ...................... 40/1.5 |
| 7,240,778 B2 | 7/2007 | Duncanson et al. |
| 7,296,665 B2 | 11/2007 | Morszeck |
| 8,032,423 B2 * | 10/2011 | Aubery et al. ............... 705/26.5 |
| 8,141,705 B2 * | 3/2012 | Aubery et al. ............. 206/315.8 |
| 2007/0108005 A1 | 5/2007 | Augenstein et al. |
| 2007/0137959 A1 | 6/2007 | Zauderer |
| 2007/0158158 A1 | 7/2007 | Ameche |
| 2007/0215425 A1 | 9/2007 | Slater |
| 2008/0000742 A1 | 1/2008 | Lee et al. |
| 2009/0019648 A1 * | 1/2009 | Jones et al. .................. 12/146 R |
| 2009/0177986 A1 * | 7/2009 | Butler et al. .................. 715/764 |

* cited by examiner

*Primary Examiner* — Anthony Stashick
*Assistant Examiner* — Cynthia Collado
(74) *Attorney, Agent, or Firm* — Dickinson Wright PLLC

(57) ABSTRACT

A method of customizing a luggage item includes providing a plurality of size options of a luggage item to allow a customer to select a particular size for a luggage item to be built. A virtual model of the size option of the luggage item selected by the customer is displayed for inspection by the customer. A plurality of different color options for a plurality of functional components to be included on the luggage item are displayed for viewing and selection by the customer. The functional components in the color option selected by the customer are displayed on the virtual model. A plurality of different color and pattern options for a front panel, a back panel, and a pair of opposing side panels a displayed for viewing and selection by the customer. The front panel, the back panel, and the pair of opposing side panels in the color and pattern option selected by the customer are displayed on the virtual model. One all the sections are completed, the luggage item is built and delivered to the customer in accordance with said selected options.

17 Claims, 5 Drawing Sheets

CUSTOMIZABLE LUGGAGE AND METHOD OF FORMING SAME

TECHNICAL FIELD

The present invention relates generally to the construction of a luggage item. More specifically, the present invention relates to the construction of a luggage item that is customizable by a customer to provide a wide range of appearances and which yields a luggage item that has a sturdy, light weight construction.

BACKGROUND OF THE INVENTION

As is well known, conventional luggage is available in many different styles and colors as well as in different sizes. Typically, at the time of purchase, a customer selects a luggage size and then a color and style for that luggage. These selections are generally based on the customer's personal preferences. The different colors and styles that a customer has to choose from are based on what the manufacturer has already predetermined for that piece of luggage. Thus, the colors, patterns, and/or styles that a customer desires or prefers are often unavailable. If the customer later desires luggage with different colors and/or styles, they would have to purchase another luggage item. Moreover, many pieces of luggage from different manufacturers are similarly shaped and are available in the same limited number of colors. For example, one common size of luggage is a carry-on type and is sized to fit in an overhead bin of an aircraft. Since these similarly sized and shaped pieces of luggage come in a limited number of colors, it can be difficult to differentiate one piece of luggage from another, particularly on an airport baggage carousel.

As is known, there are a number of different types of luggage constructions. One general type of construction is known as a hard shell type. The hard shell type is typically constructed such that the entire exterior of the piece of luggage is formed from a hard protective material, such as plastic or other suitable material. The hard material that forms the exterior of the hard shell luggage type, is beneficial in that it provides a large degree of protection to the contents of the luggage. However, the hard shell luggage type is typically only available in a limited number of colors and styles that are predetermined by the manufacturer and thus suffers from the disadvantages discussed above.

Another type of luggage construction is generally referred to as soft shell. The soft shell luggage type is characterized by an exterior that is formed of a soft material, such as a fabric or leather. The soft material that makes up the exterior of the soft shell luggage type is typically a soft, flexible material. Additionally, the soft shell luggage type does not have an interior shell or surface over which the soft material is placed. Thus, luggage of the soft shell type is generally collapsible and can conform to its interior contents as well as to the location into which it is to be stored. This type of luggage is advantageous in that it can fit into smaller spaces, is generally lighter, and is less expensive. However, the soft shell luggage only provides minimum protection to the contents placed therein. It also has limited durability, particularly when compared to the hard shell luggage type.

Another type of luggage construction is generally referred to as a hybrid. Hybrid type luggage typically includes a solid shell portion, such as a hard plastic with a fabric material fitted thereover in order to provide a different appearance from the hard shell luggage type. This type of luggage is generally more expensive because it utilizes more material than either of the other types of luggage discussed above. Additionally, it is also typically only available in a limited number of colors and sizes that are predetermined by the manufacturer, which can be undesirable, as discussed above.

It would therefore be desirable to provide a construction for a luggage item that addresses the disadvantages associated with each of the above types of luggage, while maintaining the advantages.

SUMMARY OF THE INVENTION

It is therefore an advantage of the present invention to provide a luggage item that is customizable by a customer prior to its manufacture so that it can be manufactured for the customer in a preselected color, pattern and/or style.

It is another advantage of the present invention to provide a luggage item having a construction that provides increased durability.

It is still another advantage of the present invention to provide a luggage item having a light weight construction that still maintains sufficient strength and structural integrity.

It is a further advantage of the present invention to provide a luggage item that provides increased interior packing space over similarly sized luggage pieces.

It is a related advantage of the present invention to provide a luggage item that is designed to fit in an overhead bin of an airplane.

It is yet a further advantage of the present invention to provide a method of customizing the construction of a luggage item to allow a customer to select its color, pattern and other features prior to manufacture.

In accordance with the above and the other advantages of the present invention, a method of creating a customizable luggage item is provided. In accordance with the preferred method, a customer accesses a program where they can view various luggage options and select from the various options on line. Initially, a customer can select the size and type of luggage piece they would like to build. The program then allows the customer to build and customize the appearance of the luggage as they desire and displays a virtual model representing the luggage item as it is being built. The customer can select the color of the components that are visible to the exterior, including the handle, wheel support, and other functional components, including latches, hinges, etc. The various color options for these components can be viewed online by the customer. The customer can also view a variety of patterns, colors and other fabric swatches and then select the color or pattern that they would like to form the exterior of their luggage item. Additionally, the customer can view and select the color and/or pattern for the interior lining of the luggage item. Moreover, the customer can elect to have other personalized touches added to the luggage item, including monogramming. Once the customer has built the luggage item, they can place an order for the luggage. Once the order is placed, the luggage item will be built according to the customer selected specifications and then delivered to the customer.

In accordance with the above and the other advantages of the present invention a customizable luggage item is provided. In accordance with one preferred embodiment, the luggage item, includes a back panel with a telescoping handle secured thereto. A bottom portion has a plurality of wheels extending downwardly therefrom. A rear edge of the bottom portion engages the back panel. A back ring couples the back panel to the rear edge of the bottom portion. A pair of opposing side portions engage opposing side edges of the bottom portion and are retained in place by a front ring and a back ring. The side portions extend at least partially inwardly to cover the top portion of the luggage item. The back panel, the bottom portion and the pair of opposing side portions define a luggage interior therebetween. The luggage item also includes a door panel that is secured to a door ring. The door ring is coupled to the front ring to allow the door ring and the door panel secured to it to pivot and allow access to the luggage interior.

These and other features and advantages of this invention will become more apparent to those skilled in the art from the detailed description of a preferred embodiment.

DETAILED DESCRIPTION OF A PREFERRED EMBODIMENT

Figure 1:
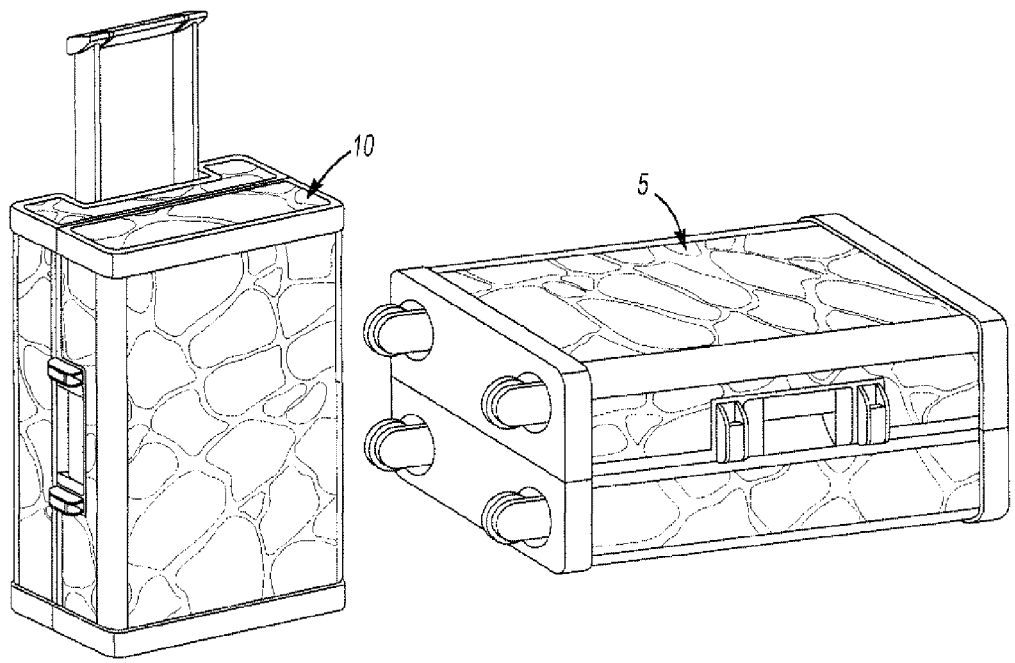
FIG. 1 is a schematic perspective view of a set of luggage in accordance with a preferred embodiment of the present invention.

The present invention relates to a method of providing a customized luggage item as well as a unique construction for a luggage item. FIG. 1 schematically illustrates a customized luggage set in accordance with a preferred embodiment of the present invention. As shown, the luggage set includes two items of luggage. The first item 5 is a larger rectangular piece that is too large to fit an in overhead bin of an airplane. The second item 10 is a smaller sized piece that is intended for carry-on purposes and is sized with the intent to fit inside an overhead bin of an airplane. As shown, the first and second luggage items 5, 10 are designed so that their exterior appearances are the same and form a matching set of luggage. In accordance with the present invention, it will be understood that a customer can customize a set of luggage such that it includes any number of pieces, i.e. more or less than two items. Additionally, the customer can include a variety of different types, styles, and sizes of luggage as part of a set or as an individual item as desired. For example, the set of luggage can include items of luggage that are the same size. Moreover, other sizes and types of luggage can be customized, including garment bags, etc.

Figure 2:
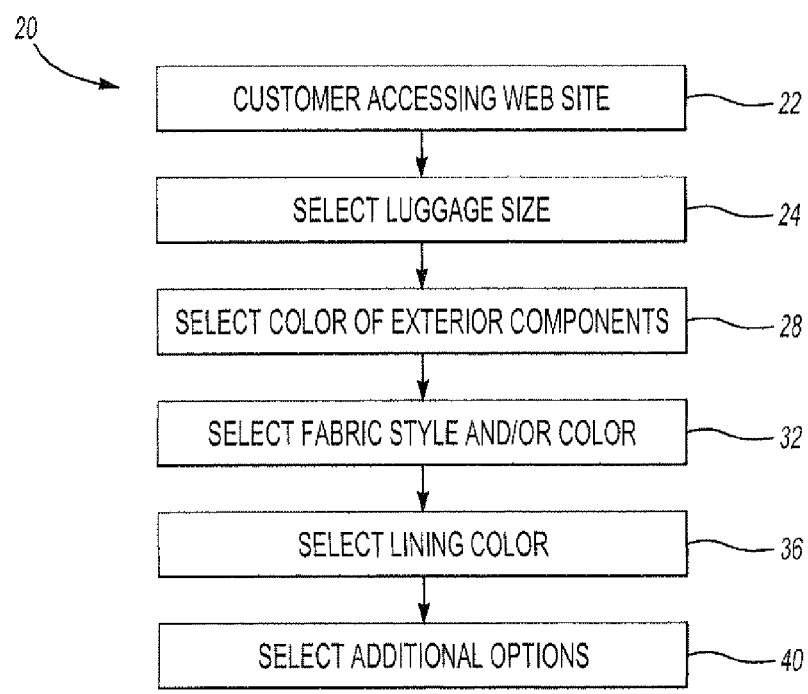
FIG. 2 is schematic flow diagram of a method of customizing a luggage item in accordance with a preferred embodiment of the present invention.
Figure 3:
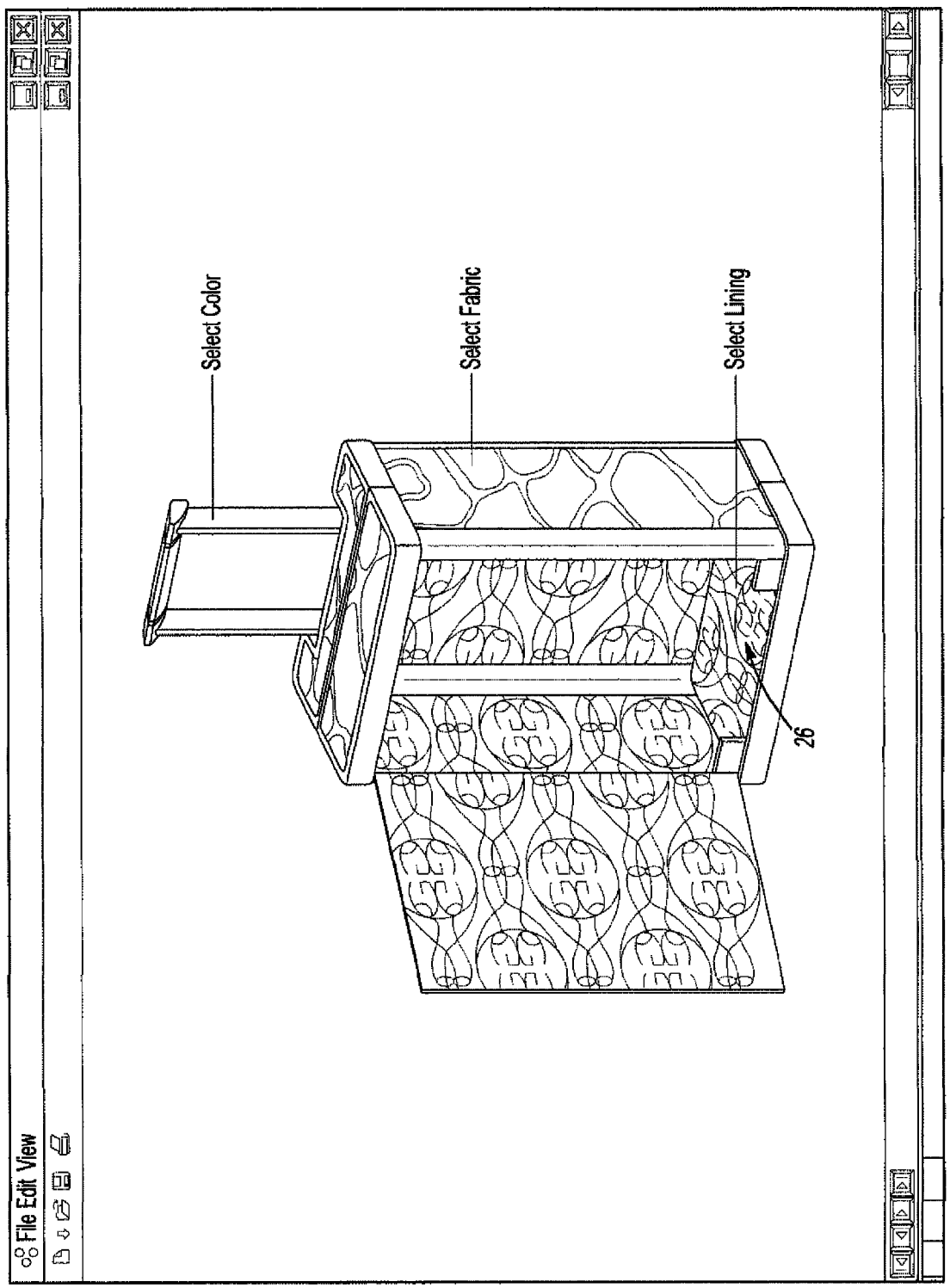
FIG. 3 schematically illustrates a step in the method of customizing a luggage item in accordance with a preferred embodiment of the present invention.
Figure 4:
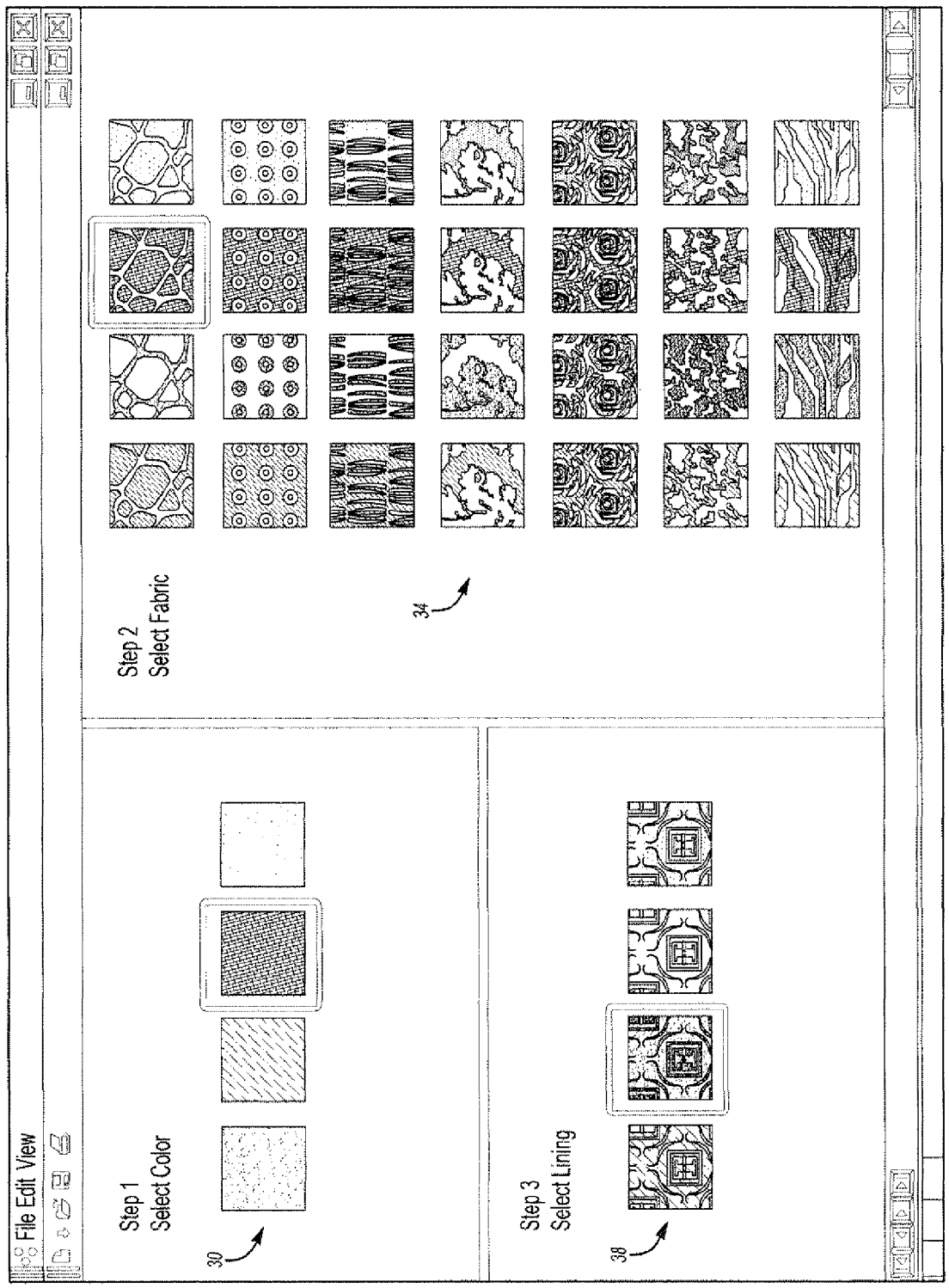
FIG. 4 schematically illustrates another step in the method of customizing a luggage item in accordance with a preferred embodiment of the present invention.

Referring now to FIGS. 2 through 4, which schematically illustrate a method of customizing a luggage item in accordance with a preferred embodiment of the present invention. The method 20 is schematically shown by the flow diagram in FIG. 2. In accordance with a preferred method, a customer accesses a program where they can build, view, and order one or more items of luggage per their specifications, as generally indicated by reference number 22. As will be appreciated, the program, which is preferably available via a website, is maintained by a manufacturer of luggage. In one embodiment, the program is stored on a server or computer that is accessible to customers and potential customers over the Internet. The server could also be maintained by someone other than the entity that manufactures the luggage. The website can be accessed by a customer using a computer, a hand held device, such as a PDA or the like, or other suitable mechanism.

Additionally, kiosks or remote computers could be placed in user frequented locations, such as in a mall, through which customers could access the program to build a customized luggage item in accordance with the method described above. In one embodiment, the kiosk would provide access to the customized luggage build program via the Internet. Alternatively, the kiosk could have the program stored locally thereon. In this alternative embodiment, the kiosk would communicate with a remote location associated with the manufacture of the customized luggage to allow the customized luggage item to be manufactured according to the user input specifications.

Once the customer has accessed the program, such as via a website, they will be able to proceed through a variety of steps in order to build an item of luggage or a set of luggage as desired. Initially, the customer will be presented with options of various types and/or sizes of luggage that they can select. Based on these options, the customer can select the type and/or size of luggage item they desire to build, as generally indicated by reference number 24. For example, the customer could select to build a carry on item of luggage, a larger item, a garment bag, or a variety of other styles or sizes. With reference to FIG. 3, once the type and/or size of luggage is selected, a virtual model representing the type and/or size of luggage selected appears on the screen to allow the customer to view the luggage item as it is being built. As shown in FIG. 3, the virtual model that is exemplarily illustrated is the carry on luggage type, as generally indicated by reference number 26.

Once the type of luggage item 10 desired by the customer is selected and displayed in the virtual model, a variety of different color options for the functional components are then displayed on the screen. This allows the customer to view and select the color of the functional components of the luggage, as generally indicated by reference number 28. In accordance with the present invention, the functional components include the handles, latches, hinges, zippers, and/or supporting or reinforcing structure, such as may be used for protecting the corners or edges of the luggage item 10. The location and shape of the functional components can obviously vary from those specifically shown. The available colors of the functional components are preferably illustrated in menu form for viewing and selection by the customer, as schematically shown in FIG. 4. However, they may be presented in other forms. In addition to color options, the customer can be presented with style options. For example, the customer could select from a variety of different hinge configurations for use on the luggage item.

In operation, the customer will select a particular color and style for the functional components. The virtual model will then change such that the selected options are displayed thereon. This allows the customer to actually see various color and/or style options as applied to the virtual model of the luggage item. It will be understood that the customer can cycle through all of the colors such that they can be viewed as applied to the virtual model. The customer can select the colors and styles in a variety of different fashions. For example, the customer can select the colors to apply to the virtual model by a mouse. Alternatively, selection can be accomplished through the use of a touch screen or other suitable selection mechanism. It will also be understood that the customer can go back and change the selected color style at any point. Indeed, any of the customer selections can be modified up until the point that they indicate the customization process is complete.

As shown in FIG. 4, four (4) different color options for the functional components are available for a customer to view and select in the menu indicated by reference number 30. However, it will be understood that more or less color options could be made available to a customer. In addition to providing a customer with various color options, a customer could also be provided with material options. In other words, the customer could also be allowed to select the material from which the functional components are selected, such as plastic, metal or other materials. As the customer selects the color for the exterior components, the virtual model 26 in FIG. 3 is automatically changed to display the color selected by the customer. The same process also applies with respect to the style of the functional components.

Next, the customer is presented with various options for the exterior panels for the luggage item, including the style, pattern and/or colors that will appear on the panels. This screen allows the customer to select the fabric style, pattern, and/or color for the panels which will make up the exterior appearance of the luggage item, as generally indicated by reference number 32. The location and configuration of these panels on the luggage item can obviously vary. Exemplary available styles, colors, and patterns of the fabrics are preferably illustrated in menu form for viewing and selection by the customer, as schematically shown in FIG. 4. As shown in FIG. 4, a multitude of different style, color, and pattern options are available for a customer to view and select in the menu, as generally indicated by reference number 34. However, it will be understood that more or less options could be made available to a customer. In addition to providing a customer with color, style and fabric options, a customer could also be provided with material options, i.e. leather, fabric etc. Again, as the customer selects the color, style, and patterns for the panels, the virtual model 26 in FIG. 3 is automatically changed to illustrate the selection made by the customer so that they can examine these selections.

As shown, the luggage item 10 has a plurality of panels, including a front panel, a back panel 60, and a pair of side panels 62, 64. One option for the customer is to have each of these panels bear the same color or pattern as selected by the customer above. Alternatively, the method 20 allows the customer to select different colors, styles, or pattern for one or more of the panels. For example, each panel could bear a different color or pattern, or two of the panels could have one color or pattern, while the other two panels could have another color or pattern. In accordance with the preferred method, the customer can select the color, style and/or pattern for each individual panel and receive a luggage item that bears this selection.

As shown, the customer can then select the color of the interior lining for the luggage item 10, as generally indicated by reference number 36. The available colors of the lining are preferably illustrated in menu form for viewing and selection by the customer, as schematically shown in FIG. 4. As shown, four different options are available for a customer to select in the menu as generally indicated by reference number 38. However, it will be understood that more or less color options could be made available to a customer. In addition to providing a customer with color options, a customer could also be provided with material or pattern options. Again, as the customer selects the color for the lining, the virtual model 26 in FIG. 3 is automatically changed to illustrate the color selected by the customer.

After the customer has built the main components of the luggage item 10, the method allows the customer to add additional details or options, as generally indicated by reference number 40. For example, the customer could have their name or initials monogrammed on the luggage. Alternatively, the customer could have another item monogrammed, such as a name or initials, to the luggage item. Additionally, the customer could have a personal logo, or photograph of a child or pet thereon to assist in the identification process of the luggage item. The customer could also request that other auxiliaries be attached to the luggage, such as a customized name tag. Additionally, the customer could select the location of pockets or storage compartments on the luggage item 10 based on their personal preference. Again, these options would be displayed on the virtual model 26 in FIG. 3 for viewing by the customer as the luggage item is being built. It will be understood that the order in which the options are selected is not important and can vary from the sequence discussed above. However, after the customer has made all the required selections and decided on all the necessary and optional features for the luggage item, the customer indicates that the customization process for the luggage item has been completed. The luggage item is then caused to be built in accordance with the customer selected specifications and then shipped to the customer.

Figure 5:
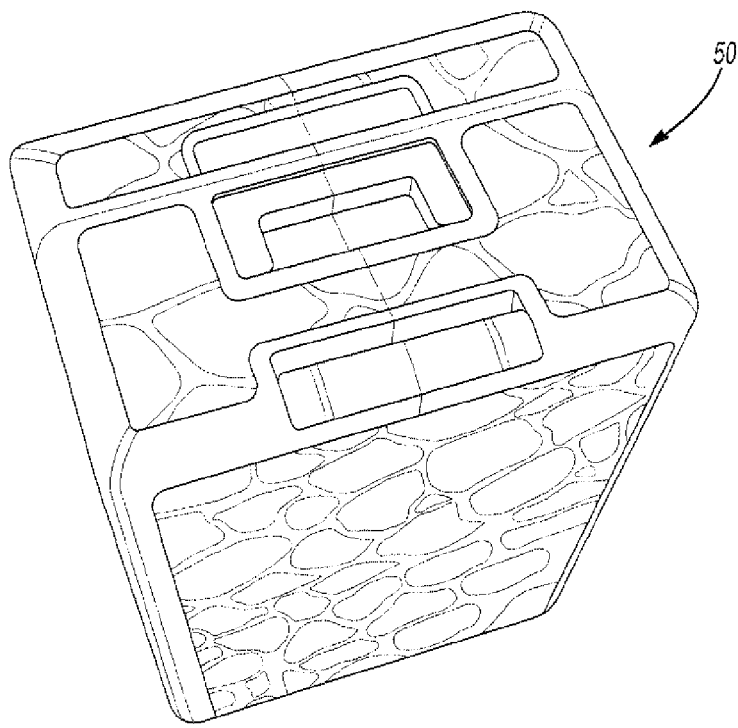
FIG. 5 is a perspective view of a customized luggage item in accordance with a preferred embodiment of the present invention.

FIG. 5 illustrates a perspective view of a carry-on luggage item 50 in accordance with a preferred embodiment of the present invention. As discussed in detail above, the exterior panels and other visible surfaces can take on a variety of colors, patterns, and styles as selected by the customer. Alternatively, the luggage item 50 can be manufactured without customization. Thus, while the customer can customize the exterior and interior of the luggage item 50, the present invention also relates to the structural configuration thereof. The present invention relates to a hybrid type luggage item that utilizes both stiff support structures and soft material. However, unlike prior hybrid-type luggage pieces, the luggage item of the present invention is lighter in weight, but still provides sufficient protection for the interior contents.

Figure 6:
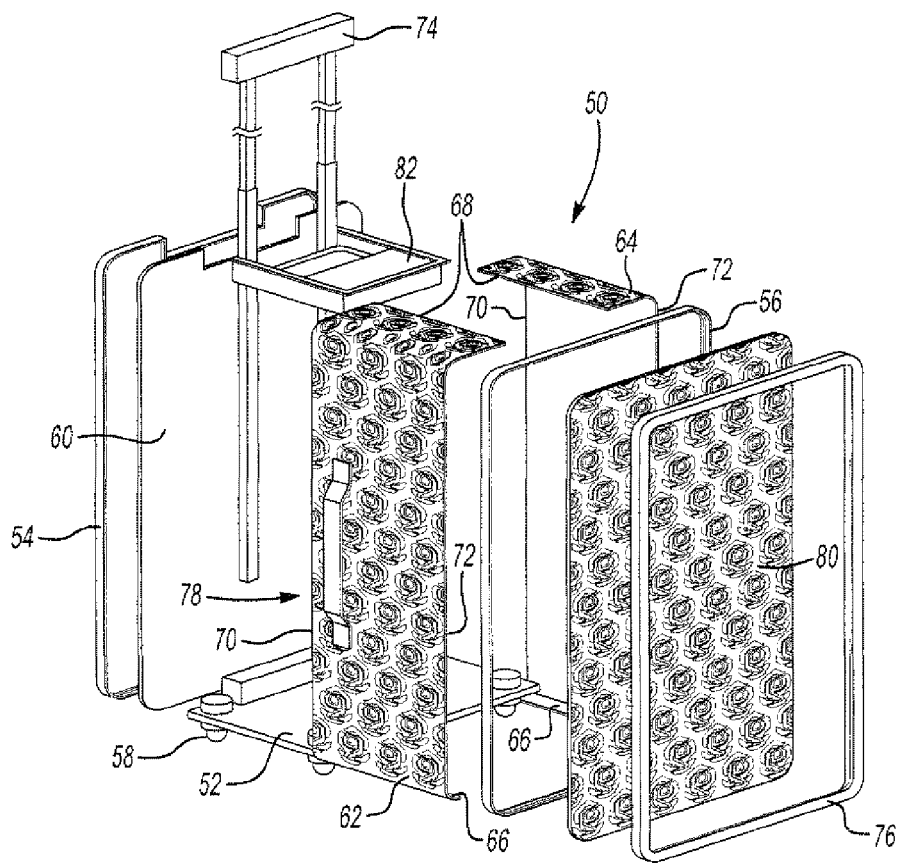
FIG. 6 is an exploded view of a luggage item in accordance with one preferred embodiment of the present invention.

FIG. 6 illustrates an exploded view of a luggage item in accordance with a preferred embodiment of the present invention. As shown, the luggage item 50 is preferably of a carry-on type and is sized to fit in an overhead bin of an airplane. However, it will be understood that the description below can apply to luggage items of other sizes. In other words, luggage items of various sizes can have the same general configuration described below. The luggage item 50 includes a variety of components that when assembled together form an item that is strong, is of relatively lightweight, and can be readily and inexpensively assembled.

The luggage item 50 includes a bottom portion 52, a back ring 54, and a front ring 56. The bottom portion 52 is preferably constructed of a hard material, such as a plastic, in order to support the weight of the contents when the luggage item 50 rests with the bottom portion 52 closest to the ground. The bottom portion, includes a back edge 60, a pair of side edges 62, 64 and a front edge 66. The bottom portion 52 also has a plurality of wheels mounted thereto. The wheels extend downwardly from the bottom portion 52 to allow the luggage item 50 to be rolled by a user. In a preferred embodiment, the bottom portion 52 has four (4) wheels 58 that can rotate 360 degrees. This makes the luggage item 50 highly maneuverable. In another embodiment, the bottom portion has two (2) wheels secured thereto. Additionally, in one embodiment, the wheels 58 are retractable upwardly into the bottom portion 52 upon application of force. This ability of the wheels 58 to retract allows the interior of the luggage item 50 to be made larger and still fit in conventional overhead bins. The wheels 58 can also lock when retracted and can be unlocked by the application of pressure to allow them to move to the extended position.

The luggage item 50 also includes a back panel 60 that is secured to the bottom portion 52 by the back ring 54. As shown, the back ring 54 preferably is rectangular in shape and includes a border portion that is constructed of a plastic material. In one embodiment, the back ring 54 has a groove formed in its lower portion which receives the back edge 60 of the bottom portion 52 therein. The bottom portion 52 can be secured to the back ring 54 by an adhesive. However, other suitable ways for securing the back ring 54 to the bottom portion 52 can be utilized. The back panel 60 will bear the color, pattern, and/or style that was selected by the customer in accordance with the method above. The back panel 60 is preferably secured around its perimeter to the border portion by an adhesive. However, other suitable securing mechanism can be secured. The back panel 60 preferably consists of a stiff panel member with a fabric having the selected color or pattern affixed thereon.

A pair of side panel portions 62, 64 are disposed on either side of the luggage item 50. The pair of side panel portions 62, 64 each have a lower groove 66 that receive the side edges 62, 64 of the bottom portion 52 therein. The bottom portion 52 can be secured to each of the side panel portions 62, 64 through an adhesive or the like. The pair of side panel portion 62, 64 also each include an upper portion 68 that extend inwardly toward one another and, at least partially, overlie the bottom portion 52. The pair of side panel portions 62, 64 each have a rear edge 70 that fits within a groove on a side portion of the back ring 54 and is secured by an adhesive or the like. Additionally, the pair of side panel portions 62, 64 each have a forward edge 72 that fits within a groove on a side portion of the front ring 56 and is secured by an adhesive or the like. The back ring 54 and the front ring 56 help secure the pair of side panel portions 62, 64 and define the luggage interior 78. This configuration provides a luggage item that is inexpensive and easy to manufacture, which thus lends itself to the method of customization discussed above.

A handle 74 is secured to the inner surface of the back panel 60. The handle 74 is preferably a pull handle that allows a user to pull the luggage item 50. The handle 74 is preferably telescopic such that it can be extended to allow the user to pull the luggage when walking and also retracted such that it is flush with the upper surface of the luggage for storage and/or transportation. A door ring 76 is coupled to the front ring 56 in such a fashion as to allow the door ring 76 to swing open to expose the interior 78 of the luggage item 50 and swing closed. The door ring 76 also retains a front panel 80, which is preferably secured by an adhesive. The door ring 76 can be coupled to the front ring 56 by a hinge. Additionally, a zipper or other securing mechanism, such as a latch, can keep the door ring 76 in a closed position as desired by a user.

In one embodiment, the upper surface of the luggage item 50 has a tray 82 disposed therein. The tray 82 rests between the upper flange portions 68 of each of the pair of opposing side portions 62, 64. The tray 82 preferably has a recessed bottom portion and a top cover that form an interior compartment. The interior compartment of the tray allows a user to store their keys, coins, phone and other items that they cannot take through an x-ray machine at the airport and would otherwise by placed in a plastic tray and passed through the conveyer. This allows a user to better protect some valuable contents from theft and also minimizes their loss due to forgetfulness on the part of the user. The cover of the tray can be secured by a latch. Additionally, a lock can also be included to keep the contents therein secure. The fully assembled luggage item 50 looks like that shown in FIG. 5.

Figure 7:
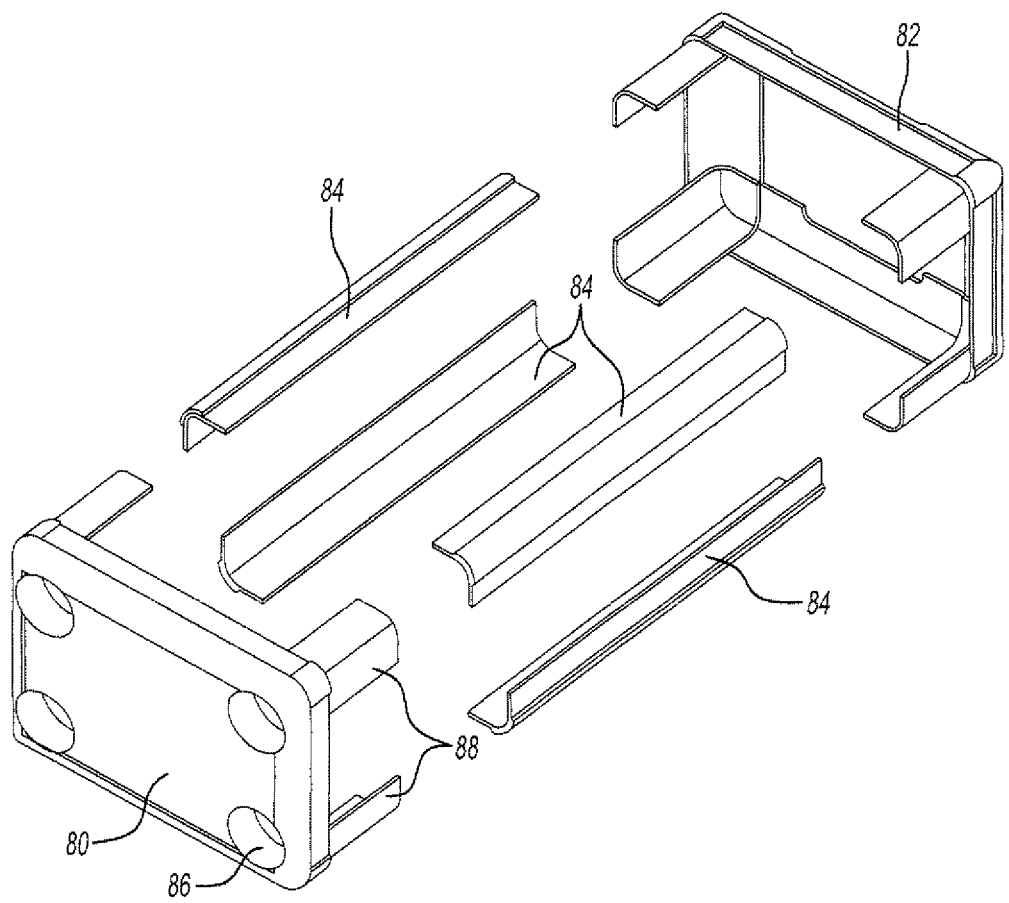
FIG. 7 is an exploded view of an internal skeleton of a luggage item in accordance with another preferred embodiment of the present invention.

FIG. 7 illustrates another embodiment of a piece of luggage 50 in accordance with another preferred embodiment of the present invention. In this embodiment, the internal support structure includes a bottom panel 80, a top panel 82, and a plurality of support pillars 84. The bottom panel 80 is preferably constructed of a hard protective material, such as a plastic and includes a plurality of wheels secured to the underside thereof. As shown, the wheels are retractable into recesses 86 in the underside, which allow the interior compartment of the piece of luggage 50 to be larger and still fit in the overhead compartment of an airplane. A plurality of upstanding posts 88 are located at each corner of the bottom panel 80.

The plurality of pillars 84 all extend between and connect the bottom panel 80 and the top panel 82. The plurality of pillars 84 also span the corners of the rectangular luggage item to provide protection thereto. The plurality of pillars 84 are also each preferably constructed of a stiff or hard protective material.

The top panel 82 is also constructed of a hard protective material and includes a plurality of downwardly extending projections 90 that are located at each corner. The downwardly extending projections are intended to engage the upper portion of a respective one of the pillars 84. When the top panel 82, the bottom panel 80, and the pillars 84 are assembled, they form a skeletal structure. A front panel, a back panel, and pair of opposing side panels are disposed and secured in a respective location to enclose the interior of the luggage item. These panel members are formed in the color and/or pattern selected by the customer, as discussed above. Once the handle, door panel and other hardware are secured thereto, the completed unit, as shown in FIG. 5, is formed.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of customizing a luggage item, comprising:
   providing a database of luggage items,
   providing a website that is in electronic communication via an Internet connection with said database of luggage items;
   providing a plurality of size options of a luggage item in said database to allow a customer to select a particular size to be built;
   displaying a virtual model on said website of said size option of the luggage item selected by said customer;
   providing a plurality of functional components of the luggage item in said database to allow said customer to select particular functional components wherein said functional components include at least one of hinges, latches, handles or zippers;
   displaying said functional components of the luggage item selected by said customer on said virtual model on said website;

providing a plurality of different color options for the said plurality of functional components in said database to be included on the luggage item for said customer to view and select;

displaying said functional components in said color option selected by said customer on said virtual model on said website;

providing a plurality of color and pattern options for a front panel, a back panel, and a pair of opposing side panels in said database for said customer to view and select;

displaying said color and pattern options selected by said customer for said front panel, said back panel, and said pair of opposing side panels on said virtual model on said website; and causing said luggage item to be built and delivered to said customer in accordance with said selected options.

2. The method of 1, wherein said customer can view said website on at least one of a local computer, a PDA, or a kiosk.

3. The method of claim 1, wherein said plurality of color options for said functional components are displayed on said website in menu form for easy visual inspection by said customer.

4. The method of claim 1, wherein said plurality of color and pattern options for said front panel, said back panel, and said pair of opposing side panels are displayed on said website in menu form for easy visual inspection by said customer.

5. The method of claim 1, further comprising:
allowing said customer to individually select a different color and pattern option for each of said front panel, said back panel, and said pair of opposing side panels.

6. The method of claim 1, further comprising:
providing an option for said customer to add at least one personal touch to the luggage item.

7. The method of claim 6, wherein said at least one personal touch includes an option for monogramming a name, initials, or a logo.

8. The method of claim 7, further comprising:
allowing said customer the option to include one or more external pockets or compartments and to specify a particular location for said one or more external pockets.

9. A method of allowing a plurality of customers to build one or more customized luggage items, comprising:
providing a database of luggage items,
providing a website that is accessible by the plurality of customers over the Internet and in electronic communication with said database of luggage items;
storing a plurality of luggage size options on said database;
displaying said plurality of luggage size options on said website for viewing by the plurality of customers and from which one or more customized luggage items could be built;
receiving a first customer selection indicating a selected luggage size option from said plurality of luggage size options from which to build said luggage item;
displaying said first customer selection indicating a selected luggage size on a virtual model to allow it to be viewed on said website;
storing a plurality of luggage functional components on said database wherein said plurality of luggage functional components includes at least one of hinges, latches, handles or zippers;
displaying said plurality of luggage functional components on said website for viewing by the plurality of customers and from which one or more luggage functional components could be selected;
receiving a second customer selection indicating a selected luggage functional components feature from said plurality of luggage functional components from which to include with said luggage item;
displaying said second customer selection indicating selected luggage functional components on said virtual model to allow it to be viewed on said website;
storing a plurality of luggage functional components color options on said database;
displaying said plurality of luggage functional components color options on said website for viewing by the plurality of customers and from which said plurality of luggage functional components could be colored;
receiving a third customer selection indicating a selected luggage functional components color option from said plurality of luggage functional components color options from which to color said plurality of luggage functional components on said luggage item;
displaying said third customer selection indicating a selected luggage functional components color selection on said virtual model to allow it to be viewed on said website;
storing a plurality of color and/or pattern options on said database;
displaying said plurality of luggage color and/or pattern options on said website for viewing by the plurality of customers and from which at least one of a front panel, a back panel, and a pair of opposing side panels could be colored and/or patterned;
receiving a fourth customer selection indicating a selected luggage color and/or pattern option from said plurality of luggage color and/or pattern options from which to color said front panel, said back panel, and/or said pair of opposing side panels;
displaying said fourth customer selection indicating a selected luggage color and/or pattern option on said virtual model to allow it to be viewed on said website;
causing said luggage item to be built pursuant to said luggage size and said luggage functional components and said luggage functional component color and said luggage color and/or pattern; and
delivering said luggage item to one of the plurality of customers in accordance with at least said first customer selection indicating a selected luggage size option, said second customer selection indicating a selected luggage functional components feature, and said third customer selection indicating a selected luggage functional components color option, and said fourth customer selection indicating a selection luggage color and/or pattern option.

10. The method of claim 9, wherein at least one of said plurality of size options is of a carry on type.

11. The method of claim 9, wherein said customer can view said website on at least one of a local computer, a PDA, or a kiosk.

12. The method of claim 9 wherein said plurality of luggage functional components color options for said plurality of functional components are displayed on said website in menu form for easy visual inspection by said customer.

13. The method of claim 9, wherein said plurality of color and/or pattern options for said front panel, said back panel, and said pair of opposing side panels are displayed on said website in menu form for easy visual inspection by said customer.

14. The method of claim 9, further comprising:
allowing said customer to individually select a different color and/or pattern option for each of said front panel, said back panel, and said pair of opposing side panels.

15. The method of claim 9, further comprising:
providing an option for said customer to add at least one personal touch to the luggage item.

16. The method of claim 15, wherein said at least one personal touch includes an option for monogramming a name, initials, or a logo.

17. The method of claim 16, further comprising:
allowing said customer the option to include one or more external pockets or compartments and to specify a particular location for said one or more external pockets.

* * * * *